United States Patent [19]

Goodman et al.

[11] Patent Number: 4,483,934

[45] Date of Patent: Nov. 20, 1984

[54] PROCESS FOR BENEFICIATING BENTONITE

[75] Inventors: Howard Goodman; Ian S. Bleakley, both of Cornwall, England

[73] Assignee: English Clays Lovering Pochin & Co., Ltd., St. Austell, United Kingdom

[21] Appl. No.: 493,353

[22] Filed: May 10, 1983

[30] Foreign Application Priority Data

May 14, 1982 [GB] United Kingdom ................. 8214170

[51] Int. Cl.$^3$ ............................................. C01B 33/13
[52] U.S. Cl. ............................. 501/147; 106/DIG. 4; 423/131; 501/145; 501/146
[58] Field of Search ....................... 501/145, 146, 147; 106/DIG. 4; 423/131, 328; 424/357

[56] References Cited

U.S. PATENT DOCUMENTS

| | | | |
|---|---|---|---|
| 2,305,404 | 12/1942 | Brown | 423/327 |
| 3,039,703 | 6/1962 | Cohn et al. | 241/5 |
| 3,162,379 | 12/1964 | Cohn et al. | 241/5 |
| 3,193,344 | 7/1965 | Iannicelli et al. | 501/146 |
| 3,408,305 | 10/1968 | Torok | 423/118 |
| 3,899,343 | 8/1975 | Lim | 501/147 |
| 4,371,626 | 2/1983 | Hertz | 501/145 |

Primary Examiner—John Doll
Assistant Examiner—Jackson Leeds
Attorney, Agent, or Firm—Stefan J. Klauber

[57] ABSTRACT

Raw bentonite is beneficiated by treating a substantially iron oxide-free bentonite, as an aqueous suspension, with an alkali at a temperature of at least 60° C.; washing the alkali treated bentonite at least once with water; and then subjecting a suspension of the alkali-treated and washed bentonite to shearing, attrition and impact forces in a homogenizer of the type wherein the suspension is forced in the form of a film through a thin, hard-surfaced gap under a pressure of at least 1.7 MPa, and at high velocity. The suspension of bentonite thus obtained can then be dried to a product which has a good white color and is more resistant to bacteriological growth.

10 Claims, No Drawings

PROCESS FOR BENEFICIATING BENTONITE

BACKGROUND OF THE INVENTION

This invention relates to a process for beneficiating raw bentonite, more particularly but not exclusively naturally occurring alkaline earth metal bentonite, to produce a bentonite product of improved whiteness and purity at a higher yield than has hitherto been possible.

Much natural raw bentonite occurs in deposits which are veined by reddish-brown iron oxide. When such bentonite is mined it tends to break up into lumps of various sizes which are heavily stained on their surface by iron oxides. In order to produce a light-coloured bentonite product it is first necessary to remove this staining by a process which, for example, subjects the surface of the lumps to scraping or abrasion. The raw bentonite may also be associated with siliceous impurities such as quartz and cristobalite which must be separated from the bentonite if the product is to be useful for cosmetic or pharmaceutical compositions. British Patent Specification No. 1,143,022 (corresponding to U.S. Pat. No. 3,408,305) describes a known process for beneficiating crude alkaline earth metal bentonites. This process has the disadvantages that the yield of bentonite product is relatively low and that the product bentonite may contain up to 10% by weight of free cristobalite. The product is also not bacteriologically sterile.

SUMMARY OF THE INVENTION

According to the present invention there is provided a process for beneficiating raw bentonite which process comprises the steps of:
 (i) treating the raw bentonite as mined to reduce substantially surface staining by iron oxides;
 (ii) treating the substantially iron oxide-free bentonite, as an aqueous suspension, with an alkali at a temperature of at least 60° C.,
 (iii) dewatering the aqueous suspension of alkali-treated bentonite;
 (iv) washing the dewatered bentonite solids from step (iii) at least once with water;
 (v) resuspending the alkali-treated and washed bentonite in water;
 (vi) subjecting the suspension formed in step (v) to shearing, attrition and impact forces in a homogeniser of the type wherein the suspension is forced in the form of a film through a thin, hard surfaced gap under a pressure of at least 1.7 MPa (250 pounds per square inch) and at high velocity; and
 (vii) drying the suspension of bentonite.

In step (i) the raw bentonite is conveniently treated in the form of lumps of varying size. The surface staining by iron oxides may be reduced by removing the iron oxides from the bentonite lumps by mechanical means, such as by hand scraping or tumbling in a trommel having steel mesh walls, or by chemical means, such as by forming the bentonite into a slurry with water containing a water-soluble reducing bleaching agent and/or a complexing agent for ferric iron. The advantage of chemical means for reducing the surface staining over mechanical means is that the waste of raw bentonite is substantially eliminated. With the mechanical means much of the raw bentonite is inevitably discarded with the surface staining. When the iron oxides are removed by chemical means the lumps of bentonite are preferably crushed and milled before treatment with the reducing bleaching agent and/or the complexing agent.

The reducing bleaching agent is conveniently sodium dithionite, but there can be used other reducing bleaching agents, for example zinc thionite or a sulphoxylate such as can be prepared by the reaction of an aldehyde with a metal salt of hydrosulphurous acid, e.g. sodium formaldehyde sulphoxylate. The pH of the slurry is preferably adjusted by adding an acid, for example sulphuric acid or hydrochloric acid, to a value in the range of from 2.5 to 4.0. After treatment with the reducing bleaching agent the bentonite is separated from the aqueous solution containing dissolved iron compounds by, for example, filtration or centrifugation. The amount of reducing bleaching agent added depends on the amount of iron present in the raw bentonite but will generally be in the range of from 2.25 to 45.0 kilograms of reducing bleaching agent per tonne of dry bentonite (i.e. from 5 to 100 lb/long ton). After chemical removal of the iron oxides the bentonite is preferably washed by performing at least once the steps of resuspending the cake formed by filtration or centrifugation in water and dewatering the suspension thus formed.

In step (ii) the aqueous suspension of the substantially iron oxide-free bentonite conveniently has a solids content in the range of from 1% to about 20% by weight of dry bentonite. The alkali used is preferably a hydroxide or carbonate of sodium, potassium or lithium. Sodium hydroxide or carbonate are especially preferred. The concentration of the alkali in the suspension is preferably at least 0.2M, and there is no advantage in using more than about 2.0M. Preferably the bentonite is treated with the alkali for at least 30 minutes at a temperature which advantageously is maintained at 90° C. or above.

In step (iii) the aqueous suspension of alkali-treated bentonite is preferably dewatered in a filter press or a centrifuge.

In step (iv) the dewatered bentonite solids are conveniently washed by performing at least once the steps of resuspending the dewatered solids in water and repeating the dewatering operation. Alternatively, water can be passed through the cake of dewatered solids in the filter press used in step (iii).

In step (v), the alkali-treated and washed bentonite is preferably formed into a suspension having a solids content in the range of from 1% to not more than about 25% by weight of dry bentonite.

In step (vi) the suspension is preferably subjected to a plurality of passes through the homogeniser, but the number of passes will not, in general, exceed six. A suitable homogeniser for use in the process of the present invention is described in British Patent Specification No. 987,176 (and in U.S. Pat. Nos. 3,039,703 and 3,162,379). Such a homogeniser is manufactured by the Manton-Gaulin Company. Advantageously the homogeniser is operated at a pressure of at least 21 MPa (3000 pounds per square inch).

In step (vii) the bentonite is preferably dried until it contains less than 10% by weight of water, and the dried bentonite is milled to a fine powder. It may be advantageous to add one or more alkali metal salts during or before the milling operation to adjust the properties of the product bentonite.

The process of the invention has the following advantageous over the prior art processes:
 1. Substantially all of the free silica is removed from the bentonite by chemical dissolution leaving substantially pure bentonite;

2. The yield of product is increased compared with the prior art processes;
3. The product bentonite is more resistant to bacteriological growth as a result of the treatment with the alkali at a temperature of at least 60° C.

The product bentonite has a good white colour and is suitable for use, for example, as a tablet disintegrant, an emulsion stabiliser or as a viscosifier or thixotropic gellant in cleansing, pharmaceutical or cosmetic compositions.

The invention is further illustrated by the following Example.

EXAMPLE

Crude, iron-stained Helms bentonite from Gonzales, Texas was dried at 60° C. to 5% by weight of water. The dried bentonite was crushed and milled until about 70% by weight thereof passed a No. 200 mesh B.S. sieve (nominal aperture 76 microns). The milled powder was dispersed in water using a low-speed mixer to form a suspension containing 5% by weight of dry crude bentonite. The pH of the suspension was reduced to 2.8 with sulphuric acid and there was then added 22.5 kilograms of sodium dithionite per tonne of dry crude bentonite (i.e. 50 lb. of sodium dithionite per long ton of dry crude bentonite). The suspension was then dewatered in a filterpress to separate a filter cake of the substantially iron-free bentonite from the aqueous medium containing dissolved iron compounds.

The filter cake was washed with water and then resuspended in 0.25M sodium hydroxide solution to form a suspension containing 2% by weight of dry crude bentonite. The suspension was then boiled for 1 hour in order to dissolve substantially all of the free silica associated with the bentonite.

The alkali-treated bentonite was then separated from the alkaline medium by filterpressing.

The cake obtained by filterpressing was washed by resuspending the cake in water to form a suspension containing 2% by weight of dry bentonite and filterpressing again.

The washed cake was resuspended in water to form a suspension containing 5% by weight of dry bentonite and the suspension was passed through a No. 300 mesh B.S. sieve (nominal aperture 53 microns).

The screened suspension was then subjected to six passes through a Manton-Gaulin homogeniser at a pressure of 34 MPa (5000 psi) with the result that aggregates were dispersed and the treated bentonite consisted of thin small plates.

The suspension was then thermally dried on a drum dryer until the water content was 5% by weight. The dried product was milled in a planetary ball mill.

The product bentonite was found to have a reflectance to light of wavelength 457 nm of 76.0 as measured by an "ELREPHO" brightness meter, in accordance with ISO Standards Nos. 2469, 2470 and 2471. The product was also found to be bacteriologically sterile and no free silica was detectable by X-ray diffraction analysis. The yield of bentonite product from the original crude bentonite was 70% by weight.

In comparison, bentonite which has been purified by the method disclosed in U.S. Pat. No. 3,408,305 was found to contain 10% by weight of free cristobalite and the yield from the original crude bentonite was 5% by weight.

What is claimed is:
1. A process for beneficiating raw bentonite which process comprises the steps of:
   (i) treating a raw bentonite, as mined, to reduce substantially surface staining by iron oxides;
   (ii) treating the substantially iron oxide-free bentonite, as an aqueous suspension, with an alkali at a temperature of at least 60° C.;
   (iii) dewatering the aqueous suspension of alkali-treated bentonite;
   (iv) washing the dewatered bentonite solids from step (iii) at least once with water;
   (v) resuspending the alkali-treated and washed bentonite in water;
   (vi) subjecting the suspension formed in step (v) to shearing, attrition an impact forces in a homogeniser of the type wherein the suspension is forced in the form of a film through a thin, hard surfaced gap under a pressure of at least 1.7 MPa and at high velocity; and
   (vii) drying the suspension of bentonite.
2. A process according to claim 1, wherein the surface staining by iron oxides is reduced substantially by forming the bentonite into a slurry with water containing at least one of a water-soluble reducing bleaching agent and a complexing agent for ferric iron, and thereafter separating the bentonite from the aqueous solution containing dissolved iron compounds.
3. A process according to claim 2 wherein the bentonite is crushed and milled before treatment with the reducing bleaching agent and/or the complexing agent.
4. A process according to claim 1, wherein, in step (ii), the aqueous suspension of the substantially iron oxide-free bentonite which is treated with an alkali has a solids content in the range of from 1% to about 20% by weight of dry bentonite.
5. A process according to claim 1, wherein, in step (ii), the alkali used is a hydroxide or carbonate of sodium, potassium or lithium.
6. A process according to claim 1, wherein, in step (ii), the bentonite is treated with the alkali for at least 30 minutes at a temperature of at least 90° C.
7. A process according to claim 1, wherein, in step (v), the alkali-treated and washed bentonite is formed into a suspension having a solids content in the range of from 1% to about 25% by weight of dry bentonite.
8. A process according to claim 1, wherein, in step (vi), the suspension is subjected to shearing, attrition and impact forces in the homogeniser with the latter being operated at a pressure of at least 21 MPa.
9. A process according to claim 1, wherein, in step (vii), the bentonite is dried thermally until it contains less than 10% by weight of water.
10. A process according to claim 1, wherein the dried bentonite obtained in step (vii) is milled to a fine powder.

* * * * *